(12) United States Patent
Butler

(10) Patent No.: US 6,241,213 B1
(45) Date of Patent: Jun. 5, 2001

(54) DIAPHRAGM VALVE

(75) Inventor: Ronald G. Butler, Mountville, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/520,200

(22) Filed: Mar. 7, 2000

(51) Int. Cl.[7] .................................................. F61K 31/44
(52) U.S. Cl. ........................ 251/264; 251/157; 251/187; 251/215; 251/331; 251/284
(58) Field of Search .................... 251/157, 187, 251/215, 264, 273, 296, 331, 284

(56) References Cited

U.S. PATENT DOCUMENTS

| | | | |
|---|---|---|---|
| 4,408,745 | * | 10/1983 | Swiers et al. ........................ 251/357 |
| 4,867,201 | * | 9/1989 | Carten .............................. 137/625.18 |
| 5,377,956 | * | 1/1995 | Muller ................................... 251/331 |
| 5,609,185 | * | 3/1997 | Booth et al. .......................... 137/556 |
| 5,694,971 | * | 12/1997 | Wilcock ................................ 137/318 |

* cited by examiner

Primary Examiner—Kevin Shaver
Assistant Examiner—D A Bonderer
(74) Attorney, Agent, or Firm—Menotti J. Lombardi

(57) ABSTRACT

A valve including: a bonnet; a body secured to the bonnet and including at least two ports and at least one weir positioned between the ports; a valve stem being movably coupled with the bonnet, the valve stem including first and second longitudinal ends, and a recess in the first longitudinal end; a diaphragm positioned substantially adjacent to the second end of the valve stem so as to be deflectable towards the weir by the valve stem to restrict a flow between the ports; a handwheel rotatably secured to the valve stem so as to enable a torque to be applied to the valve stem, the handwheel including a longitudinal aperture; and, a screw directed through and engaged with the handwheel aperture and being selectively engagable within the recess of the valve stem, such that the valve stem and handwheel remain in a constant relative longitudinal position with respect to one another, and when the diaphragm sets against the weir the handwheel abuts the bonnet to serve as a closing lift valve stop.

20 Claims, 1 Drawing Sheet

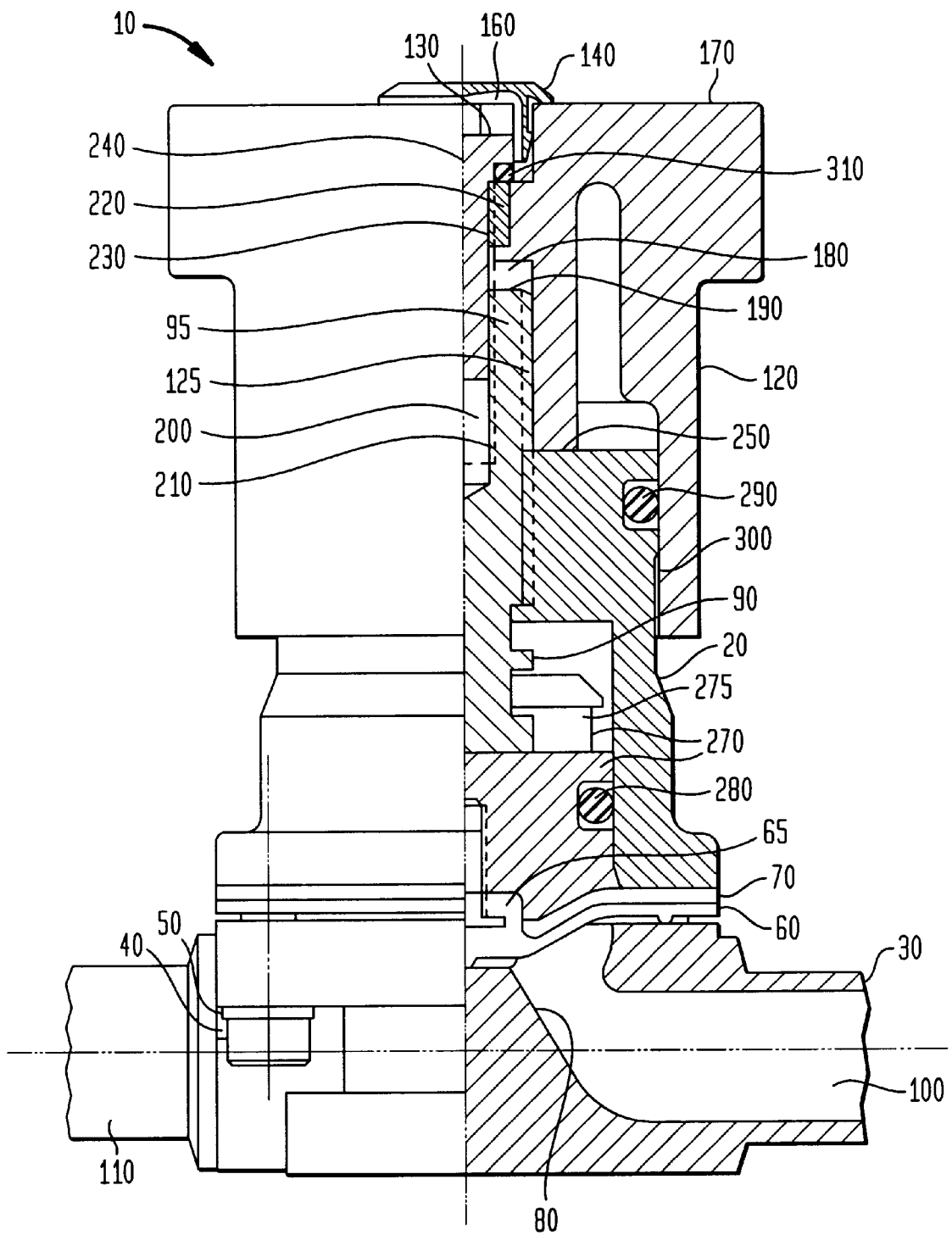

DIAPHRAGM VALVE

FIELD OF THE INVENTION

The present invention relates generally to diaphragm valves, and more particularly to diaphragm valves being manually operable by a handwheel to actuate a diaphragm by the use of a rotatable valve stem.

BACKGROUND OF INVENTION

Diaphragm valves selectively operable to restrict or permit fluid flow are generally well known in the art. Such valves conventionally include a weir or valve seat. An elastomeric or plastic diaphragm can be set against and removed from the valve seat responsively to rotation of a valve stem. The valve stem serves to transfer forces which in turn deflect the diaphragm and hence open and close the valve. A handwheel is typically rotatably coupled to the valve stem for exerting rotational forces to the valve stem sufficient to deflect the diaphragm. It is also well known manually actuated valves provided with elastomeric or plastic diaphragms may experience damage to the diaphragm during closing. During closing, the diaphragm may be exposed to high closing forces, ultimately resulting in premature failure and leakage through the valve.

One approach to solving this problem includes using a nut which acts as a travel stop and which is threaded on top of the valve stem. This nut is positioned on the valve stem such that it bears against the top of the valve bonnet when the valve stem has reached the intended limit during the closing. This travel stop protects the diaphragm from excessive forces during valve closing. This nut may be tapped in a flat to accommodate a set screw to secure the nut to the valve stem flat preventing movement of the nut. This nut can also serve as the drive mechanism between the valve stem and the handwheel. A shortcoming of this approach lies in the difficulty of adjusting the position of such a valve stop. In order to adjust the valve stop, typically one must completely remove a screw securing the handwheel to the valve stem, remove the handwheel, loosen the set screw, back the travel stop nut off the valve stem, rotate the valve stem to close the valve, rotate the travel stop nut to contact the bonnet thus setting the new travel stop, tighten the set screw to prevent inadvertent movement of the travel stop nut, reinstall the handwheel and resecure the handwheel to the valve stem. This typically requires a technician using at least three separate tools at great time and expense.

U.S. Pat. No. 5,377,956 ('956 patent), entitled "DIAPHRAGM VALVE" issued Jan. 3, 1995, the entire disclosure of which is hereby incorporated by reference as if being set forth in its entirety herein. The '956 patent describes the use of a limiter screw nut threadably enagaged with an exterior of a valve stem and which bears upon an upper body of the valve for limiting the closing lift of the valve stem. As is well known though, there are a number of reasons which may prevent the valve from fully closing, and such a configuration undesirably requires fully removing the handwheel and cap to fully close the valve in such an instance. Further, complete removal of the handwheel and cap are also required to access the limiter screw nut in order to change its position relative to the valve stem and hence change the closing travel stop of the valve.

Accordingly, it is an object of the present invention to overcome these shortcomings, and provide a diaphragm valve that facilitates easier repositioning of the valve stop.

It is a further object of the present invention to provide a diaphragm valve which does not require the handwheel to be completely removed in order to adjust the valve stop for the valve stem.

SUMMARY OF INVENTION

A valve including: a bonnet; a body secured to the bonnet and including at least two ports and at least one weir positioned between the ports; a valve stem being movably coupled with the bonnet, the valve stem including first and second longitudinal ends, and a recess in the first longitudinal end; a diaphragm positioned substantially adjacent to the second end of the valve stem so as to be deflectable towards the weir by the valve stem to restrict a flow between the ports; a handwheel rotatably secured to the valve stem so as to enable a torque to be applied to the valve stem, the handwheel including a longitudinal aperture; and, a screw directed through and engaged with the handwheel aperture and being selectively engagable within the recess of the valve stem, such that the valve stem and handwheel remain in a constant relative longitudinal position with respect to one another, and when the diaphragm sets against the weir the handwheel abuts the bonnet to serve as a closing travel stop.

BRIEF DESCRIPTION OF THE FIGURES

FIG. 1 illustrates a diaphragm valve according to a preferred embodiment of the present invention.

DETAILED DESCRIPTION OF INVENTION

Referring now to FIG. 1, there is illustrated a partial cross-section of a preferred embodiment of the diaphragm valve 10 according to the present invention. The valve 10 includes bonnet 20 secured to body 30 by bolts 40 and washers 50. Diaphragm 60 and cushion backing 70 are secured between the body 30 and bonnet 20, and are adapted to be deflected against weir 80 to obstruct flow between ports 100 and 110 by the stem 90 bearing against the compressor 270. The diaphragm 60 includes a portion 65 threaded into the compressor 270. The compressor has a T-slot 275 milled into it, which the stem 90 slides into during assembly, longitudinally securing the stem 90 to the compressor 270. Thus, as the stem 90 is displaced towards or away from the weir 80, the compressor 270 is correspondingly displaced. As will be understood by those possessing ordinary skill in the pertinent art, the compressor 270 and stem 90 T-slot 275 connection is important as it permits the stem 90 to be rotatable with respect to the compressor 270. If the compressor 270 rotated with the stem 90, the diaphragm 60 could become unthreaded from the compressor 270 and thus would not follow the compressor 270 and stem 90 to the open position. Further, the closing position of the diaphragm 60 would no longer correspond to the valve travel stop position and damage to the diaphragm could result. For this reason, the end of the stem 90 which contacts the compressor 270 has portions having first and second diameters, wherein the second diameter is larger than the first. Thus, this end of the stem 90 slips into the compressor 270 T-slot 275 and pushes and pulls the compressor 270 correspondingly to longitudinal movement of the stem 90. Of course, other suitable configurations for this stem 90 and compressor 270 coupling which enable the stem 90 to rotate with respect to the compressor 270, yet ensure that the compressor 270 longitudinally tracks movement of the stem 90 could be used.

The stem 90 is threaded about its outer periphery and is threadably engaged with internal threads of the bonnet 20, such that when the stem 90 is rotated it is displaced longitudinally within the bonnet 20, and hence causes the diaphragm 60 to either deflect towards or away from the weir 80 depending upon the direction of rotation of the stem 90. Handwheel 120 is inserted over and couples with the stem 90 such that when rotated, it rotates the stem 90 with it. Such can be readily accomplished by providing the stem 90 with a flat portion 95 adapted to mate with a recess 125 in the handwheel 120 which is inserted over the stem 90. Alternatively, the stem 90 can have another geometric shape near surface 190 such that it mates with a corresponding interior geometric surface of the handwheel 120 so as to rotatably secure the stem 90 to the handwheel 120 when the handwheel 120 has been inserted over the stem 90.

Thus, as the handwheel 120 is rotated in a first direction (e.g. clockwise), the stem 90 is longitudinally displaced towards the weir 80 with respect to the bonnet 20 and causes the diaphragm 60 to set against the weir 80 and obstruct flow between the ports 100 and 110 (e.g. close the valve 10). In a preferred form of the present invention, the diaphragm 60 is molded in a position like that it is in when the valve is closed. Further, as the handwheel 120 is rotated in a second, opposite direction (e.g. counter-clockwise), the stem 90 is longitudinally displaced away from the weir 80 with respect to the bonnet 20 which enables the diaphragm 60 to be removed from against the weir 80. This permits flow between the ports 100 and 110 (e.g. open the valve 10).

More particularly, as the valve stem 90 is longitudinally displaced towards the weir 80 it abuts compressor 270, which is preferably formed of stainless steel, which in turn exerts a force upon cushion 70 and diaphragm 60 towards weir 80, which in turn deflects cushion 70 and diaphragm 60. O-rings 280, 290 and 310 help seal the bonnet 20, as the valve stem 90 is longitudinally displaced there within. An indicator band 300, preferably of a highly visible color such as red, indicates the position of valve stem 90 and hence how open or closed the valve 10 is, as it is obscured by longitudinal displacement of the handwheel 120 towards weir 80 as the valve is closed.

According to the present invention, an aperture 160 opens through a top surface 170 of the handwheel 120 and into an interior recess 180 within the handwheel 120 adjacent to an uppermost surface 190 of the stem 90. The stem 90 likewise preferably includes an interior recess 200 opening from the surface 190 down the longitudinal center of the stem 90. The interior surface 210 of the recess 200 is preferably threaded.

An insert 220 preferably formed of a metal such as brass or other suitable material is inserted within the aperture 160 and includes an interior surface 230 which is also threaded. In the preferred embodiment, the pitch of the threaded surfaces 210 and 230 are identical. In a particularly preferred embodiment the common pitch is 32 threads per inch. A screw 240 having the same pitch as the surfaces 210 and 230 is inserted into the aperture 160 such that it is threadably engaged with the surfaces 210 and 230. Therefore, when inserted the screw 240 serves to secure the handwheel 120 to the stem 90 such that they remain in a constant longitudinal position relative to one another. Therefore, when the stem 90 is longitudinally displaced, so is the handwheel 120 as their position relative to one another is secured by screw 240 being threadably engaged with surfaces 210 and 230. Furthermore, it should be recognized that as the handwheel 120 is rotated, the stem 90 is longitudinally displaced, and hence the handwheel is correspondingly longitudinally displaced. A cap 140 can be inserted over the head of screw 240 according to one embodiment of the invention.

It should be recognized, that according to the present invention the handwheel 120 and bonnet 20 cooperate to act as a travel stop. More particularly, as the handwheel 120 is rotated in a given direction so as to deflect the diaphragm 60 towards the weir 80 and close the valve 10, the stem 90 and handwheel 120 are longitudinally displaced towards the weir 80. Thus, the handwheel 120 and bonnet 20 will come to bear against one another at point of contact 250, thus preventing further longitudinal displacement of the handwheel 120 towards the weir 80 and hence preventing additional rotation of the handwheel 120 in the given direction.

The diaphragm valve 10 according to the present invention overcomes the shortcomings of the previous designs by reducing the number of tools needed to adjust the valve stop from three to one, the number of steps required from nine to three, and eliminating the need to completely remove the handwheel and screw securing the handwheel to the valve from the valve stem. To adjust the travel stop according to the present invention the screw 240 is loosened and only backed out of the recess 200 of the stem 90, accordingly the handwheel 120 and stem 90 are no longer secured in a set position relative to one another. The screw 240 can remain engaged with or be backed out of the surface 230, either will not effect operation. The handwheel 120 is then rotated (preferably clockwise) until the valve 10 is closed, remembering that rotation of the handwheel 120 still causes rotation of the stem 90 because of flat portion 95 and recess 125 for example, and that rotation of the stem 90 causes the stem 90 to be longitudinally displaced within the bonnet 20, and the diaphragm 60 to deflect towards the weir 80 as has been discussed. Once valve 10 is closed, the handwheel 120 is pressed towards the bonnet 20 so as to assure the bonnet 20 and handwheel 120 bear against one another at point of contact 250, and the screw 240 is retightened so as to again be threadably engaged with the surface 210 of the stem 90, thus again securing the handwheel 120 relative to the stem 90 and setting the new travel stop position.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

What is claimed is:

1. A valve comprising:

a bonnet;

a body secured to said bonnet and including at least two ports and at least one weir positioned between said ports;

a valve stem being movably coupled with said bonnet, said valve stem including first and second longitudinal ends, and a recess in said first longitudinal end;

a diaphragm positioned substantially adjacent to said second end of said valve stem so as to be deflectable towards said weir by said valve stem to restrict a flow between said ports;

a handwheel rotatably secured to said valve stem so as to enable a torque to be applied to said valve stem, said handwheel including a longitudinal aperture; and, a screw directed through and engaged with said handwheel aperture and being selectively engagable within said recess of said valve stem, such that said valve stem and handwheel remain in a constant relative longitudinal position with respect to one another, and when said diaphragm sets against said weir said handwheel abuts said bonnet to serve as a closing valve travel stop.

2. The valve of claim 1, wherein said valve stem includes a threaded exterior surface being threadably engaged with said bonnet.

3. The valve of claim 2, further comprising an insert secured within said aperture in said handwheel, said insert including a longitudinal, threaded aperture.

4. The valve of claim 3, wherein said insert comprises brass.

5. The valve of claim 3, wherein said recess in said valve stem is threaded.

6. The valve of claim 5, wherein said threaded handwheel insert, valve stem recess and screw have a same given pitch.

7. The valve of claim 6, wherein said pitch is approximately 32 threads per inch.

8. The valve of claim 6, wherein said screw is threadably engaged with said aperture and said recess and secures said handwheel and valve stem in substantially fixed a longitudinal position relative to one another.

9. The valve of claim 8, wherein when said screw is threadably engaged only with said handwheel, said valve stem and handwheel are longitudinally displaceable with respect to one another to enable said closing travel stop to be set.

10. The valve of claim 1, wherein said valve stem is longitudinally displaceable within said bonnet by rotating said handwheel.

11. An improved diaphragm valve including a bonnet, a body secured to said bonnet and including two ports, a diaphragm secured between said body and said bonnet and being adapted to deflect to restrict a flow between said ports, a valve stem moveably engaged within said bonnet, said valve stem including first and second longitudinal ends, said second longitudinal end adapted to impart a force to said diaphragm sufficient to deflect it, and an actuator rotatably secured to said valve stem so as to enable a torque to be imparted to said valve stem, said valve undesirably being prone to experiencing damage to said diaphragm due to excessive torques being applied by said actuator, said improvement comprising:

a longitudinal aperture through said actuator;

a longitudinal recess in said first longitudinal end of said valve stem; and, a screw directed through and engaged with said actuator aperture and being selectively engagable within said recess of said valve stem such that said valve stem and actuator remain in a constant relative longitudinal position with respect to one another, and when said diaphragm sets against said weir said actuator abuts said bonnet to serve as a closing lift valve stop.

12. The valve of claim 11, wherein said actuator comprises a handwheel.

13. The valve of claim 11, wherein said valve stem includes a threaded exterior surface being threadably engaged with said bonnet.

14. The valve of claim 13, further comprising an insert secured within said aperture in said actuator, said insert including a longitudinal, threaded aperture.

15. The valve of claim 14, wherein said insert comprises brass.

16. The valve of claim 14, wherein said recess in said valve stem is threaded.

17. The valve of claim 16, wherein said threaded insert, valve stem recess and screw have a same given pitch.

18. The valve of claim 17, wherein when said screw is threadably engaged with said aperture and said recess, said screw secures said handwheel and valve stem in substantially fixed a longitudinal position relative to one another.

19. The valve of claim 18, wherein when said screw is threadably engaged only with said actuator, said valve stem and handwheel are longitudinally displaceable with respect to one another to enable said closing lift valve stop to be set.

20. A method for adjusting a closing lift valve stop for a diaphragm valve comprising a bonnet, a body secured to said bonnet and including two ports, a diaphragm secured between said body and said bonnet and being adapted to deflect to restrict a flow between said ports, a valve stem moveably engaged within said bonnet and including first and second longitudinal ends, and an actuator rotatably secured to said valve stem so as to enable a torque to be imparted to said valve stem, said valve undesirably being prone to experiencing damage to said diaphragm due to excessive torques being applied by said actuator, said method comprising:

partially desecuring said actuator from said valve stem such that said actuator remains rotatably secured to said valve stem but longitudinally repositionable with respect to it;

rotating said valve stem so as to deflect said diaphragm against said weir thereby closing said valve;

pressing said actuator against said bonnet to set said closing travel stop; and, resecuring said actuator to said valve stem such that said valve stem and actuator are longitudinally and rotatably secured with respect to one another.

\* \* \* \* \*